US010957051B2

(12) United States Patent
Ueda

(10) Patent No.: US 10,957,051 B2
(45) Date of Patent: Mar. 23, 2021

(54) MOTION VIDEO SEGMENTING METHOD, MOTION VIDEO SEGMENTING DEVICE, AND MOTION VIDEO PROCESSING SYSTEM

(71) Applicant: PANASONIC INTELLECTUAL PROPERTY MANAGEMENT CO., LTD., Osaka (JP)

(72) Inventor: Junko Ueda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 16/094,276

(22) PCT Filed: Feb. 15, 2017

(86) PCT No.: PCT/JP2017/005487
§ 371 (c)(1),
(2) Date: Oct. 17, 2018

(87) PCT Pub. No.: WO2017/183270
PCT Pub. Date: Oct. 26, 2017

(65) Prior Publication Data
US 2019/0392586 A1 Dec. 26, 2019

(30) Foreign Application Priority Data
Apr. 22, 2016 (JP) .............................. JP2016-086199

(51) Int. Cl.
*G06T 7/215* (2017.01)
*H04N 21/84* (2011.01)
(Continued)

(52) U.S. Cl.
CPC .............. *G06T 7/215* (2017.01); *G06T 7/246* (2017.01); *H04N 21/84* (2013.01); *H04N 21/8456* (2013.01)

(58) Field of Classification Search
CPC combination set(s) only.
See application file for complete search history.

(56) References Cited

U.S. PATENT DOCUMENTS

2007/0024709 A1* 2/2007 Osada ................. H04N 5/232
348/143
2012/0315020 A1* 12/2012 Fiumi ................ H04N 5/44543
386/278
(Continued)

FOREIGN PATENT DOCUMENTS

JP 2010-016878 1/2010
JP 2011-221920 11/2011

OTHER PUBLICATIONS

The Extended European Search Report dated Mar. 28, 2019 for European Patent Application No. 17785615.0.
(Continued)

*Primary Examiner* — Helen Zong
(74) *Attorney, Agent, or Firm* — Greenblum & Bernstein, P.L.C.

(57) ABSTRACT

To provide a motion video segmenting method, a motion video segmenting device, and a motion video processing system that are capable of reducing variation of time required for processing in a case where a motion video is segmented at a predetermined time, and an image processing device performs predetermined processing on a segmented motion video. The motion video segmenting device calculates a load value for each pack based on a rate of an image in which a difficulty degree is high included in the pack, and determines an image processing device having a smallest accumulation value of the load value of the pack which is
(Continued)

transmitted previously as the transmission destination when image processing device which is the transmission destination of the pack is determined.

7 Claims, 8 Drawing Sheets

(51) Int. Cl.
*H04N 21/845* (2011.01)
*G06T 7/246* (2017.01)

(56) References Cited

U.S. PATENT DOCUMENTS

2015/0189222 A1* 7/2015 John ................ H04N 21/44008
348/441
2018/0359413 A1* 12/2018 Wu .................... H04N 5/23245

OTHER PUBLICATIONS

Tanabiki et al., "Sports Video Analysis Solution", Panasonic Technical Journal, vol. 61, No. 2, Nov. 2015, pp. 78-83.
Official Communication issued in International Pat. Appl. No. PCT/JP2017/005487, dated Apr. 18, 2017.

* cited by examiner

| RATE OF D_level:High | LOAD VALUE |
|---|---|
| 0 | 1 |
| LARGER THAN 0 AND LESS THAN 0.25 | 2 |
| 0.25 OR MORE AND LESS THAN 0.5 | 3 |
| 0.5 OR MORE AND LESS THAN 0.75 | 4 |
| 0.75 OR MORE AND 1 OR LESS | 5 |

MOTION VIDEO SEGMENTING METHOD, MOTION VIDEO SEGMENTING DEVICE, AND MOTION VIDEO PROCESSING SYSTEM

TECHNICAL FIELD

The present disclosure relates to a motion video segmenting method, a motion video segmenting device, and a motion video processing system that perform processing on a motion video such as a sports video.

BACKGROUND ART

In recent years, tracking of position information of a player or a ball through a game is performed, a posture analysis, a behavior analysis, tracking of a position, and the like for each player are performed, and they are fed back to tactics of training or a next game for example, based on a sports motion video such as soccer.

In a case where a person manually analyzes many images configuring a motion video, much labor, time, or hand is required. Therefore, for example, NPL 1 discloses a sports video analysis system in which image analysis processing is automatically performed by a computer and in a case where the computer is erroneous, correction is accepted by the hand of a person, so that the analysis can be immediately performed and labor of a person can be reduced.

CITATION LIST

Non Patent Literature

NPL 1: Masamoto Tanabiki, and five others, "Sports Video Analysis Solution", Panasonic Technical Journal Vol. 61 No. 2 November 2015, p. 78-83

SUMMARY OF THE INVENTION

In the technique disclosed in NPL 1, the motion video is segmented into files at predetermined times, image analysis is performed on each file which is segmented by the computer, corrections are performed by a plurality of correctors to each segmented file for which the image analysis is performed, and then the segmented files are joined. The image analysis performed by the computer includes, for example, a process of tracking positions of a player, a ball, and the like, a process of detecting a posture of the player, and the like. In the technique disclosed in NPL 1, times required for the image analysis processing and the correction thereof are reduced by such an operation.

However, in a case where it is segmented into a file including a complicated motion and a file including monotonous motion, there is a high possibility that the file including the complicated motion is corrected more than the file including the monotonous motion. Therefore, even if the plurality of the correctors having equivalent correction technique perform the correction of the file including the complicated motion and the file including the monotonous motion each having the same length at the same time, variation may occur in the time required for the correction by analysts. When there is a variation in the time required for the correction by the correctors, it becomes difficult to shorten an operation time from segmenting the files to compositing corrected files, so that it is desired to reduce variation in the time required for the correction.

The present disclosure provides a motion video segmenting method, a motion video segmenting device, and a motion video processing system that are capable of reducing variation of time required for processing in a case where a motion video is segmented at a predetermined time, and an image processing device performs predetermined processing on a segmented motion video.

In the present disclosure, there is provided a motion video segmenting method including by a processor, extracting a feature amount from an image configuring a motion video; determining a difficulty degree of performing an editing operation of the images based on the feature amount; segmenting the images configuring the motion video into a plurality of groups for each of images of a predetermined number of frames; and determining an image processing device to be a transmission destination of one group based on the difficulty degree of images configuring the segmented one group.

According to the disclosure, in a case where the motion video is segmented at a predetermined time and the image processing device performs predetermined processing on the segmented motion video, it is possible to reduce variation of a time required for processing.

DESCRIPTION OF EMBODIMENTS

Hereinafter, embodiments will be appropriately described with reference to the drawings. However, detailed description may be omitted more than necessary. An unnecessarily detailed explanation is, for example, a detailed explanation of already well known matters, a duplicate explanation for substantially the same configuration, or the like. This is to avoid the unnecessary redundancy of the following description and to facilitate understanding by those skilled in the art.

It should be understood that the following description and the drawings referred to are provided to enable those skilled in the art to understand the present disclosure and thereby they are not intended to limit the gist described in the claims.

[1.1 Configuration]

Figure 1:
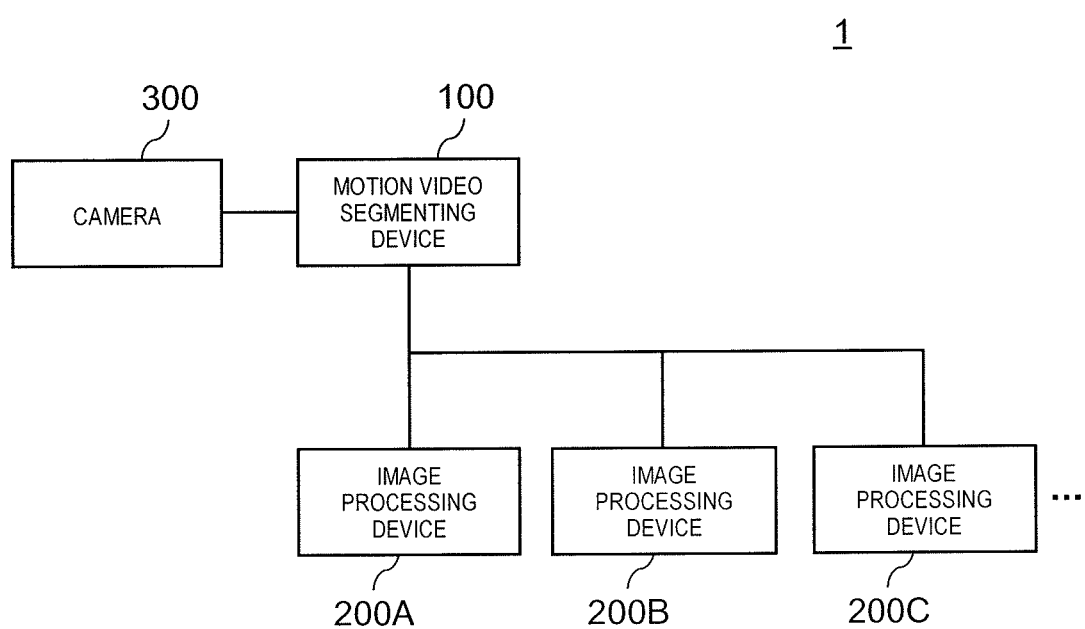
FIG. 1 is a diagram illustrating an example of a configuration of a motion video processing system.

FIG. 1 is a diagram illustrating an example of a configuration of motion video processing system 1. As illustrated in FIG. 1, motion video processing system 1 includes motion video segmenting device 100, a plurality of image processing devices 200A, 200B, 200C, and camera 300. Motion video segmenting device 100 and camera 300, and motion video segmenting device 100 and the plurality of image processing devices 200A, 200B, 200C, . . . are connected so as to be capable of communicating to each other. Hereinafter, the plurality of image processing devices 200A, 200B, 200C, . . . may be described as image processing device 200.

Figure 2:
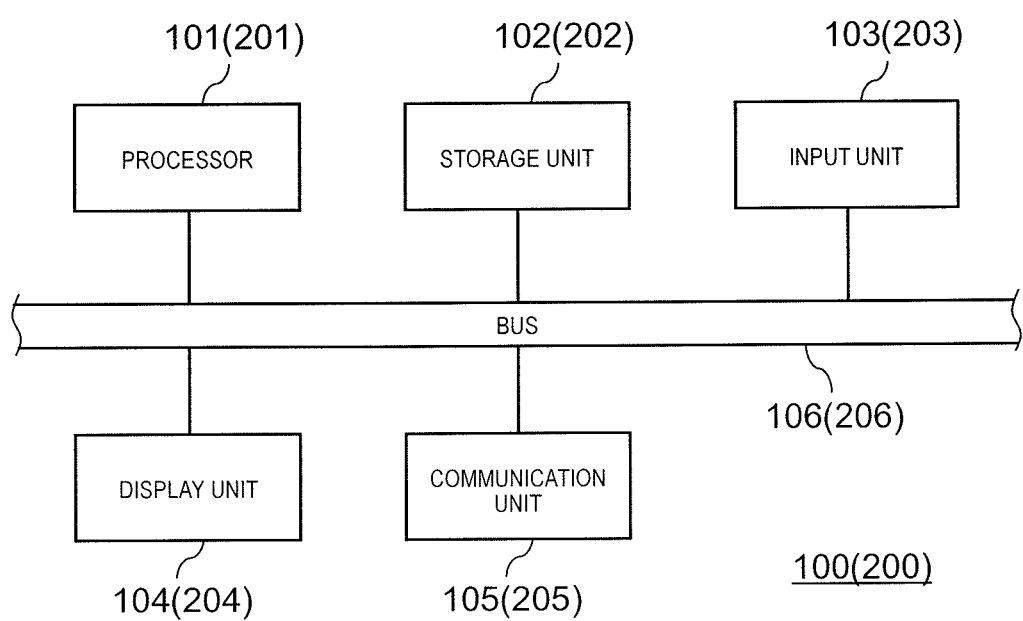
FIG. 2 is a diagram illustrating an example of a configuration of a motion video segmenting device (or an image processing device).

Motion video segmenting device 100 and image processing device 200 are configured by, for example, computers such as PCs and workstations. FIG. 2 is a diagram illustrating an example of a configuration of motion video segmenting device 100 (or image processing device 200). As illustrated in FIG. 2, motion video segmenting device 100 (or image processing device 200) includes processor 101 (201), storage unit 102 (202), input unit 103 (203), display unit 104 (204), communication unit 105 (205), and bus 106 (206).

Processor 101 (201) performs calculation so as to control configuration elements other than motion video segmenting device 100 (or image processing device 200).

Storage unit 102 (202) temporarily or permanently stores information. Storage unit 102 (202) corresponds to a Read Only Memory (ROM), a Random Access Memory (RAM), or the like of motion video segmenting device 100 (or image processing device 200). In the example illustrated in FIG. 2, motion video segmenting device 100 (or image processing device 200) has only one storage unit 102 (202), but may have a plurality of storage units 102 (202) if necessary. Storage unit 102 (202) may be configured of, for example, a Hard Disk Drive (HDD), a Synchronous Dynamic Random Access Memory (SDRAM), a Solid State Drive (SSD), or the like.

Input unit 103 (203) accepts an input from an outside. Input unit 103 (203) may be configured by, for example, an input device such as a mouse, a keyboard, or a trackball.

Display unit 104 (204) displays information to the outside. Display unit 104 (204) may be configured by, for example, a display device such as a liquid crystal display or an organic EL display.

Communication unit 105 (205) transmits and receives information to and from the outside. Communication unit 105 (205) may be configured by, for example, a communication interface such as a communication port or a wireless communication device. Motion video segmenting device 100 can transmit and receive information to and from image processing device 200 via communication unit 105. In addition, image processing device 200 can transmit and receive information to and from motion video segmenting device 100 via communication unit 205.

Bus 106 (206) is a path for connecting each element configuring motion video segmenting device 100 (or image processing device 200). Bus 106 (206) can be configured inside processor 101 (201) by combining bus 106 (206) with processor 101 (201). Bus 106 (206) may be connected by wire to each element or may be connected wirelessly to each element.

The configuration of motion video segmenting device 100 (or image processing device 200) which is described above is an example. Therefore, motion video segmenting device 100 (or image processing device 200) may be configured by adding another configuration element to the configuration described above. In addition, motion video segmenting device 100 (or image processing device 200) may be configured by deleting a part of a configuration element from the configuration described above if necessary. In addition, motion video segmenting device 100 (or image processing device 200) may be configured by combining the configuration elements described above with each other. In addition, motion video segmenting device 100 (or image processing device 200) may be configured by a part of the configuration elements described above.

Camera 300 photographs an object to be photographed, generates an image, and transmits the image to motion video segmenting device 100. In motion video processing system 1 of the disclosure, the image photographed by camera 300 is a motion video, for example, including 30 frames per second, that is, 30 still images per one second.

[1.2 Operation]

Next, an operation of motion video processing system 1 will be described. In the following description, the operation of motion video segmenting device 100 is mainly performed by processor 101 in cooperation with respective other configuration elements of motion video segmenting device 100.

Motion video processing system 1 tracks a position of a player, a sports equipment (ball or the like), or the like reflected in the motion video based on a sports video configured by the motion video of the sports event photographed by camera 300. In the disclosure, for example, the sports event is supposed to be one in which a plurality of players play at the same time, such as soccer or American football but, for example, may be one in which one player plays at one time such as golf.

The sports video may be configured by a motion video which is photographed by one camera 300, or may be configured by joining motion videos photographed by a plurality of cameras 300. Particularly, in a case where a game with a wide field such as soccer is photographed, it is desirable to join the motion videos photographed by the plurality of cameras 300. A technique for combining the motion videos is not particularly limited in the disclosure.

Figure 3:
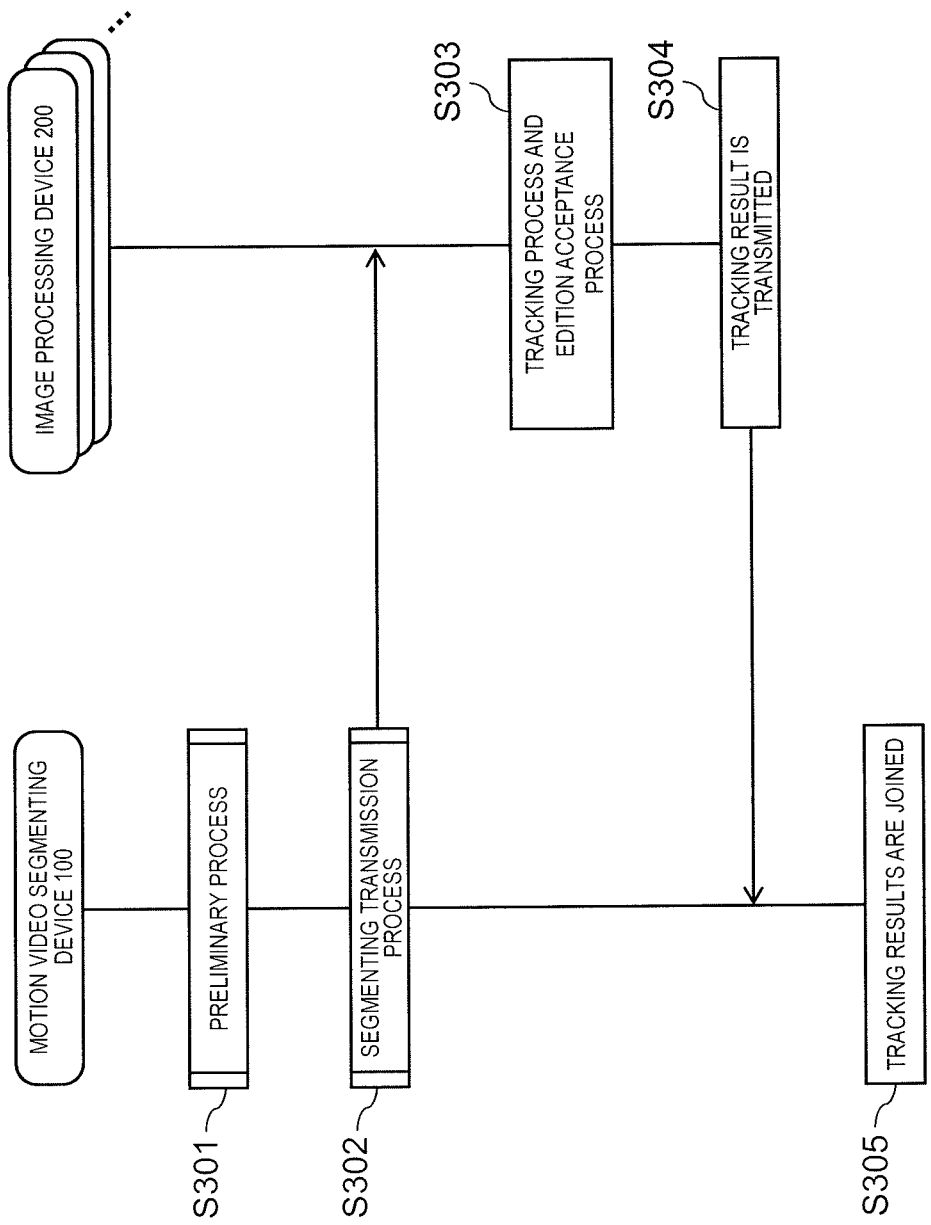
FIG. 3 is a sequence diagram for explaining a flow of an overall operation of the motion video processing system.

FIG. 3 is a sequence diagram for explaining a flow of an overall operation of motion video processing system 1.

In step S301, motion video segmenting device 100 performs a preliminary process for segmenting the sports video. The preliminary process is processing for setting a region corresponding to the background in advance (for example, before the game starts) and acquiring background information in order to distinguish the player and the background (for example, a stadium or the like), for example, in the motion video. Details of the preliminary process will be described later.

In step S302, motion video segmenting device 100 segments the motion video into a plurality of pieces using information acquired in the preliminary process in step S301 and performs a segmenting transmission process which is transmitted to a plurality of image processing devices 200. Details of the segmenting transmission process will be described later.

In step S303, each of the plurality of image processing devices 200 performs a tracking process for tracking the position of the player, the ball, or the like reflected in the motion video on the segmented motion video received from motion video segmenting device 100, and an edition acceptance process for accepting an editing operation of an error in the tracking process performed by image processing device 200. The tracking process in image processing device 200 can use, for example, a moving body tracking technique of the related art.

The editing operation of an error in the tracking process is, for example, as follows. In a state where players are densely moving in the motion video, or the like, in the moving body tracking technique of the related art, for example, it is possible to be a situation in which two players who move adjacently are confused or the foot of the player is misidentified as a ball. When such a situation occurs, normal tracking of the player cannot be performed, so that it is necessary for the eyes of a person to check a result of the tracking process and perform correction. The edition acceptance process is a process of accepting the editing operation by a person (hereinafter, referred to as a corrector) who views a result of the tracking process. Specifically, for example, image processing device 200 displays the result of the tracking process on display unit 204 in almost real time and causes the corrector to determine whether or not the tracking process is incorrect. In a case where the tracking process is incorrect, the corrector accepts the correction via input unit 203. Image processing device 200 performs the edition acceptance process as described above.

In step S304, image processing device 200 transmits the result (one in which the editing operation is reflected) of the tracking process in step S303 to motion video segmenting device 100.

In step S305, motion video segmenting device 100 joins the results of the tracking process in the segmented motion video transmitted from image processing device 200 in step S304, and generates a tracking result through the motion video.

With such an operation, motion video processing system 1 can perform the tracking process of the player, the ball, or the like in the sports video with high accuracy in a short time.

[1.2.1 Preliminary Process]

Hereinafter, the preliminary process performed by motion video segmenting device 100 in step S301 of FIG. 3 will be described in detail. The preliminary process includes an extraction process of background information and a setting process of a difficulty degree determination region. Hereinafter, the extraction process of the background information and the setting process of the difficulty degree determination region will be described individually.

(1) Extraction Process of Background Information

A background region is a region in which one other than the player or the ball is reflected in still images configuring the motion video of the sports video. That is, the background region is, for example, a region in which a stadium in which the sports event is performed is reflected.

In the extraction process of the background information, first, motion video segmenting device 100 acquires an image in which the stadium of the sports which is a target of the sports video photographed therefrom is reflected from camera 300, and displays the image on display unit 104.

Figure 4:
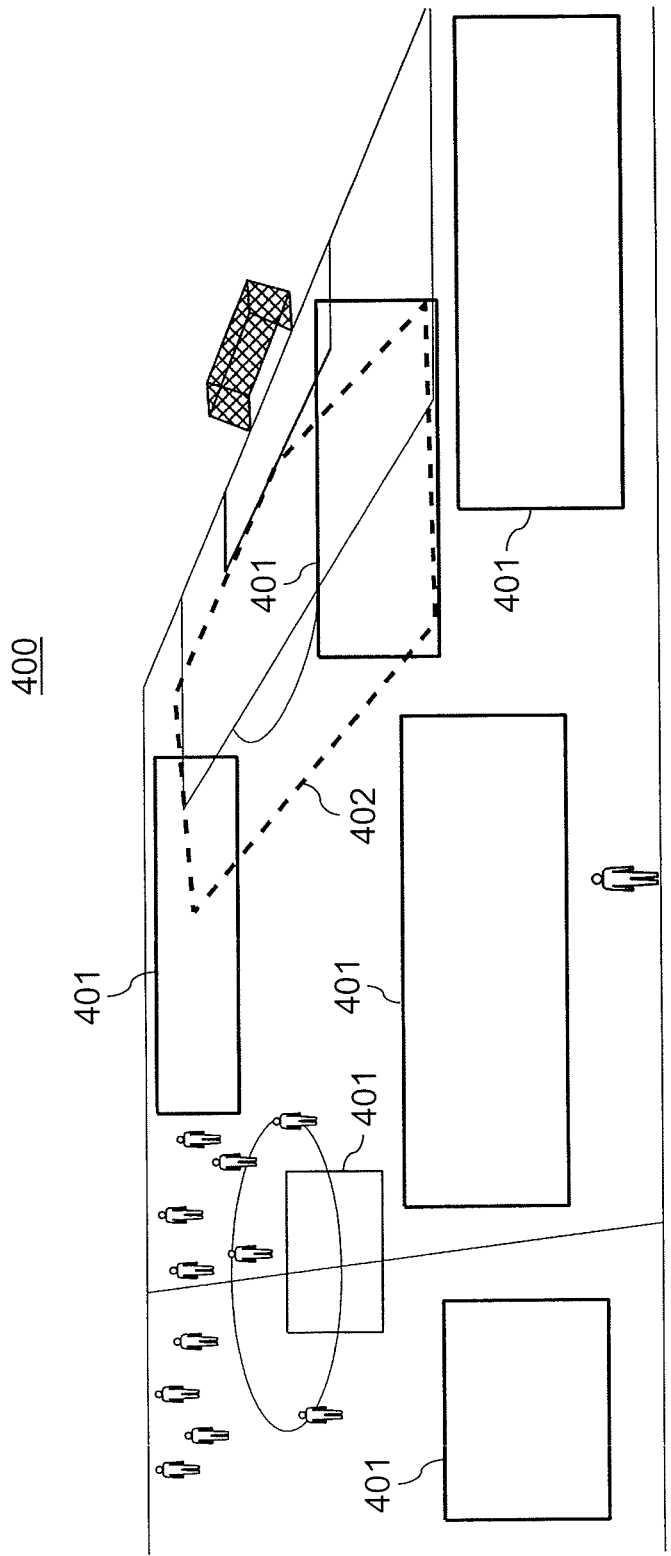
FIG. 4 is a view illustrating an example of a screen displayed on a display unit in an extraction process of background information.

FIG. 4 is a view illustrating an example of a screen displayed on display unit 104 in the extraction process of the background information. FIG. 4 is a screen displaying an image of field 400 of soccer photographed before game starts as an example of the sports event.

As illustrated in FIG. 4, in the preliminary process, it is desirable that the screen displayed on display unit 104 is an image where there are a few players or the players are not scattered throughout the stadium in order to set the background region in which the player or the like is not reflected. Therefore, the preliminary process is performed, for example, immediately before the game starts.

At the start of the preliminary process, motion video segmenting device 100 displays the image of the stadium on display unit 104 and then displays an instruction message of an effect that an operator selects the background region. When the operator who views the instruction message performs a selection operation to select the background region via input unit 103 for the image of the stadium displayed on display unit 104, motion video segmenting device 100 accepts a selection operation. Therefore, motion video segmenting device 100 sets the background region. For example, the operator is a person who performs an operation in the preliminary process while viewing display unit 104.

In FIG. 4, regions 401 surrounded by solid lines illustrate the background regions selected by the operator. The operator designates region 401 illustrated in FIG. 4 using, for example, an operation device such as a mouse, a trackball, or a touch panel configuring input unit 103. When the instruction message of the effect that the background region is selected is displayed to the operator, motion video segmenting device 100 instructs the operation to set a region, which does not include an object that may move during the game such as the player or the ball, as the background region. Motion video segmenting device 100 can set region 401 in which the player, the ball, or the like is not included as the background region by following the instruction by the operator. In FIG. 4, since a person or the like is present in the image of the stadium, region 401 is set by the operator so as to avoid the person. In a case where the person or the like is not present in the image of the stadium, the whole field may be designated as region 401.

Motion video segmenting device 100 extracts information included in each pixel of a region for each region 401 set by the operator and stores the information in storage unit 102 as the background information. One which is extracted by motion video segmenting device 100 as the background information is, for example, a range of a hue value obtained by region 401. Motion video segmenting device 100 may extract not only the hue but also a value of saturation and/or a value as the background information.

(2) Setting Process of Difficulty Degree Determination Region

Motion video segmenting device 100 performs the setting process of the difficulty degree determination region in addition to the extraction process of the background information described above as the preliminary process. The difficulty degree determination region is a region which is set to determine whether or not the difficulty degree of the editing operation is high in the edition acceptance process for accepting the editing operation performed by the corrector on the result of the tracking process performed by image processing device 200. The difficulty degree determination region of the embodiment corresponds to a specific region of the disclosure.

In the preliminary process, the order in which the extraction process of the background information and the setting process of the difficulty degree determination region which are described above are performed is not limited by the disclosure. That is, the extraction process of the background information may be performed first, the setting process of the difficulty degree determination region may be performed first, or the extraction process of the background information and the setting process of the difficulty degree determination region may be performed at the same time.

Whether or not the difficulty degree of the editing operation is high may be determined, for example, based on a feature amount extracted from the image (still image) of each frame configuring the motion video. In the embodiment, for example, a case where a rate occupied by a region corresponding to the player to the whole image is adopted as the feature amount extracted from the image will be described.

In the setting process of the difficulty degree determination region, motion video segmenting device 100 displays an instruction message to the operator on display unit 104. The instruction message indicates that the difficulty degree determination region is to be set. When the operator who views the instruction message performs the selection operation for selecting the difficulty degree determination region via input unit 103 for the image of the stadium displayed on display unit 104, motion video segmenting device 100 accepts the selection operation thereof. Therefore, motion video segmenting device 100 sets the difficulty degree determination region.

Specifically, the operator designates region 402, for example, illustrated in FIG. 4 using the operation device such as a mouse, a trackball, or a touch panel configuring input unit 103. When the instruction message, indicating that the difficulty degree determination region is to be set, is displayed to the operator, for example, motion video segmenting device 100 instructs the operator to set a region, in which many players may be present during the game, as the difficulty degree determination region. Motion video segmenting device 100 can set region 402 in which many players may be present during the game as the difficulty degree determination region by following the instruction by the operator.

In FIG. 4, region 402 surrounded by a dotted line illustrates the difficulty degree determination region which is selected by the operator. In FIG. 4, as an example, a case where a vicinity of a penalty area in a soccer field is selected as the difficulty degree determination region is illustrated. The vicinity of the penalty area is a region where it is easy to play involved in scoring and for the players to be more likely to be densely populated in a case where the ball is in the penalty area, so that it is desirable that the region is set as the difficulty degree determination region. In the disclosure, the difficulty degree determination region is not limited to the vicinity of the penalty area. For example, another region of the field may be selected and set as the difficulty degree determination region and in a case of another sports event, a region, where the players are more likely to be densely populated and which is specific to the game, may be selected and set as the difficulty degree determination region.

Region 402 which is selected by the operator as the difficulty degree determination region may be not only one but also plural.

Motion video segmenting device 100 stores a position of the region in storage unit 102 as position information of the difficulty degree determination region for each region 402 set by the operator. The position information of the difficulty degree determination region may be, for example, information in which any coordinate system is set in the still image and which includes a coordinate indicating the position of the difficulty degree determination region in the coordinate system, or the like.

[1.2.2 Segmenting Transmission Process]

Figure 5:
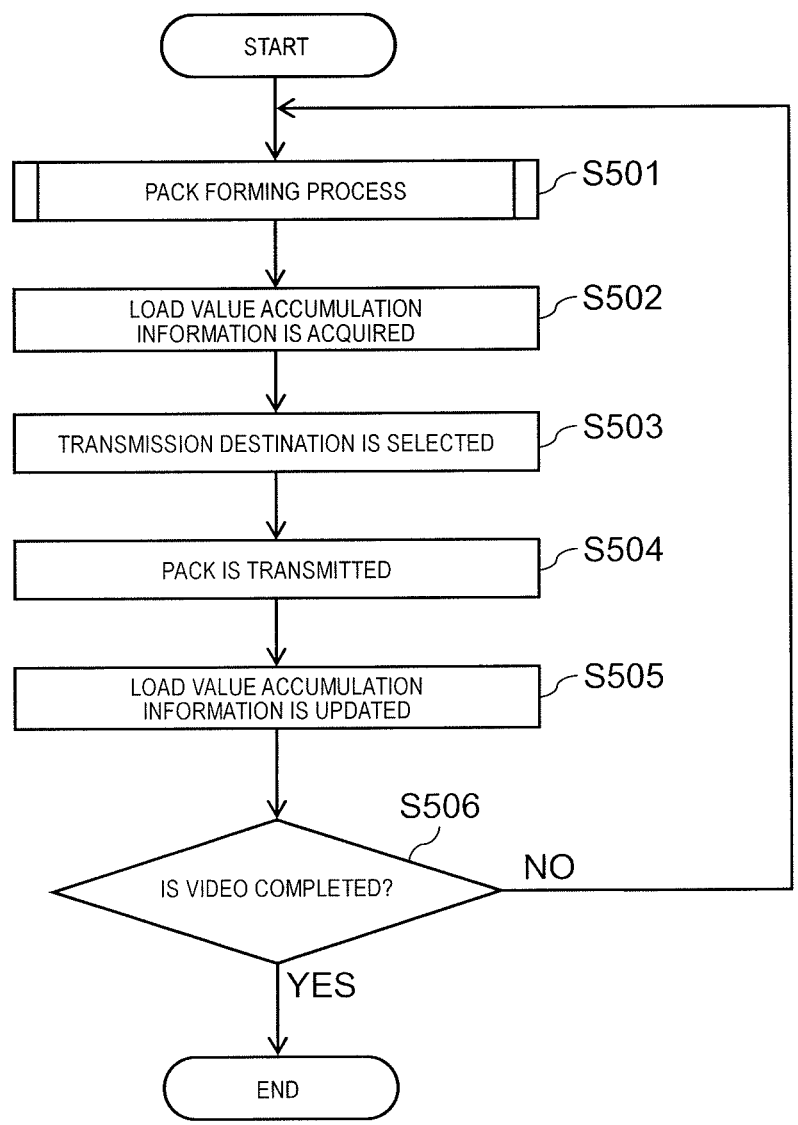
FIG. 5 is a flowchart for explaining an operation of the motion video segmenting device in a segmenting transmission process.

Next, the segmenting transmission process in step S302 of FIG. 3 will be described in detail. FIG. 5 is a flowchart for explaining an operation of motion video segmenting device 100 in the segmenting transmission process.

In step S501, motion video segmenting device 100 performs a pack forming process on the motion video photographed by camera 300. The pack forming process is a process of segmenting the motion video and forming a plurality of groups (hereinafter, referred to as packs).

Here, the plurality of the packs are obtained by segmenting the motion video photographed by camera 300 for every predetermined number of frames. Specifically, for example, in a case where the motion video photographed by camera 300 is configured by the still images of 30 frames per second, for example, each pack is segmented so as to include the still images of 750 frames.

[1.2.2.1 Pack Forming Process]

Figure 6:
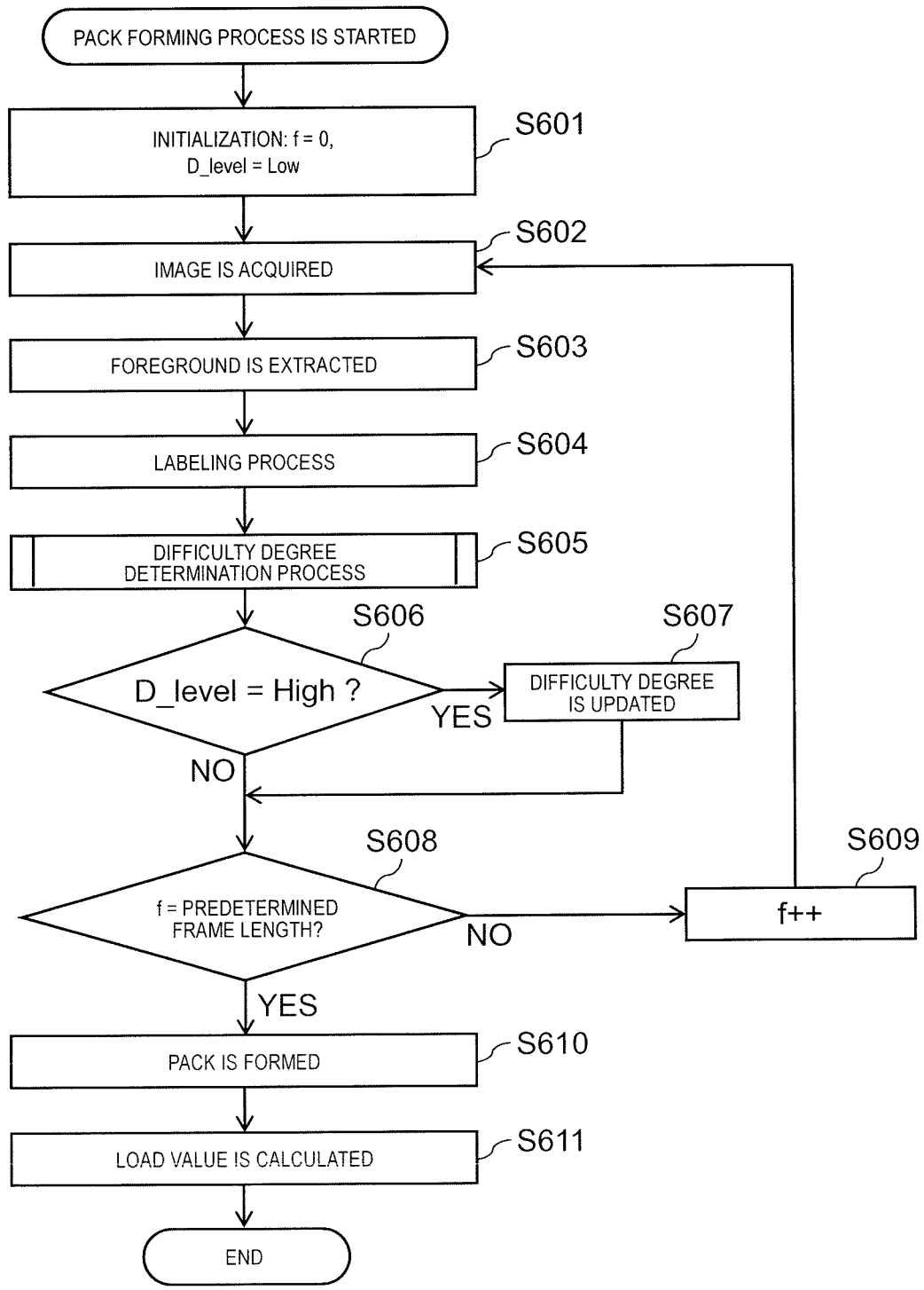
FIG. 6 is a flowchart for explaining an operation of the motion video segmenting device in a pack forming process.

Hereinafter, details of the pack forming process will be described. FIG. 6 is a flowchart for explaining an operation of motion video segmenting device 100 in a pack forming process. A processing target of the pack forming process illustrated in FIG. 6 is each still image configuring the motion video input from camera 300.

In step S601, motion video segmenting device 100 performs initialization of parameters used in the pack forming process. The parameters used in the pack forming process are the number of frames f and difficulty degree D_level of the still image corresponding to the number of frames f. The number of the frames is initialized to f=0 and the difficulty degree is initialized to D_level=low by initialization of step S601.

In step S602, motion video segmenting device 100 acquires the still image of $f^{th}$ frame of the motion video input from camera 300. In step S603, motion video segmenting device 100 extracts a foreground region from the still image acquired in step S602.

The foreground region is a region other than the background region in the still image. That is, in step S603, motion video segmenting device 100 extracts a foreground image based on the background information extracted in the preliminary process which is described above. Specifically, information of the hue or the like extracted as the background information is compared to information of the hue of each pixel in the still image, so that an image configured of pixels having large divergence as a result of the comparison is extracted as the foreground image. Motion video segmenting device 100 generates a binarized image in which a pixel value of the pixels configuring the background region is set to 0 (black) and a pixel value of the pixels configuring the foreground region is set to 255 (white) respectively in the still image of the $f^{th}$ frame. Hereinafter, the binarized image generated by motion video segmenting device 100 in step S603 is referred to as the foreground image.

In step S604, motion video segmenting device 100 performs a labeling process using the foreground image generated in step S603. The labeling process is a process in which the same number is allocated to continuous pixels of which a pixel value is 255 (white). That is, different numbers are assigned to respective independent foreground regions by the labeling process. In the following description, the foreground region in which the labeling process is performed is referred to as a labeling region and the number of the labeling regions in the foreground image is referred to as a labeling number. In step S604, motion video segmenting device 100 generates position information of the labeling region relating to the position of the labeling region and stores the position information in storage unit 102.

In step S605, motion video segmenting device 100 performs the difficulty degree determination process. The difficulty degree determination process is a process of determining whether or not the difficulty degree of the editing operation is high in the edition acceptance process of accepting the editing operation performed by the corrector with respect to the result of the tracking process performed by image processing device 200.

[1.2.2.1.1 Difficulty Degree Determination Process]

Figure 7:
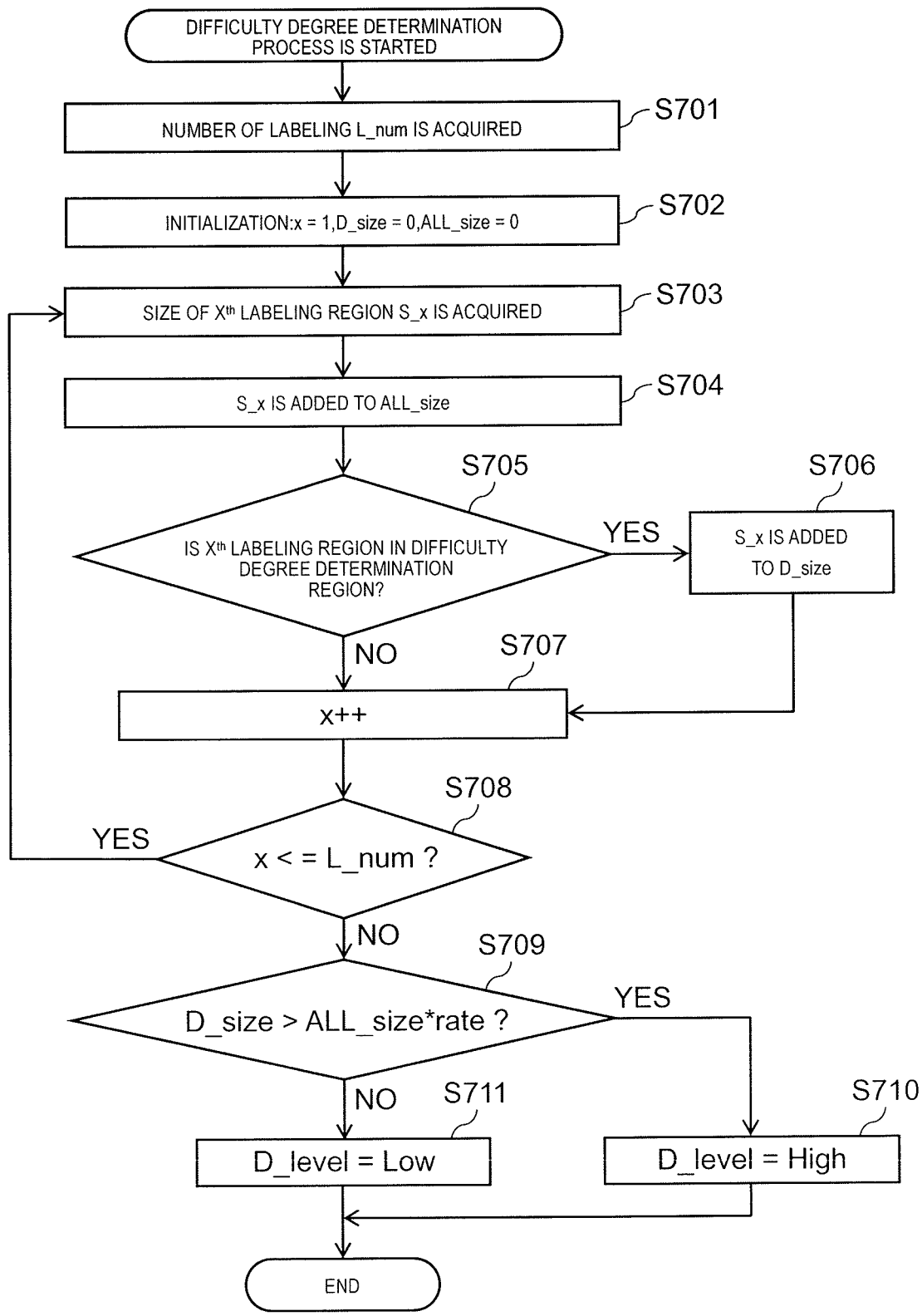
FIG. 7 is a flowchart for explaining an operation of the motion video segmenting device in a difficulty degree determination process.

Hereinafter, details of the difficulty degree determination process will be described. FIG. 7 is a flowchart for explaining an operation of motion video segmenting device 100 in the difficulty degree determination process.

In step S701, motion video segmenting device 100 acquires the number of labeling L_num determined by the labeling process of step S604 in the still image of the $f^{th}$ frame that is the processing target In step S702, motion video segmenting device 100 performs initialization of the parameters used in the difficulty degree determination process. The parameters used in the difficulty degree determination process are counter value x indicating what number of the labeling region in the still image, foreground amount D_size in the difficulty degree determination region, and foreground amount ALL_size of the whole still image. Moreover, the foreground amount is an amount indicating a size of the foreground region, specifically, for example, the number of pixels In step S703, motion video segmenting device 100 acquires size S_x of an $x^{th}$ labeling region. In step S704, motion video segmenting device 100 adds size S_x of the $x^{th}$ labeling region to foreground amount ALL_size of the whole still image.

In step S705, motion video segmenting device 100 determines whether or not the $x^{th}$ labeling region is within the difficulty degree determination region. The determination in step S705 may be performed based on the position information of the difficulty degree determination region and the position information of the labeling region. In a case where it is determined that the $x^{th}$ labeling region is within the difficulty degree determination region in step S705 (step S705: Yes), the procedure proceeds to step S706 and otherwise (step S705: No), the procedure proceeds to step S707.

In step S706, motion video segmenting device 100 adds size S_x of the $x^{th}$ labeling region to foreground amount D_size within the difficulty degree determination region. The procedure proceeds to step S707.

In step S707, motion video segmenting device 100 increments counter value x by 1 and the procedure proceeds to step S708.

In step S708, motion video segmenting device 100 determines whether or not counter value x reaches the number of labeling L_num. In a case where it is determined that counter value x does not reach the number of labeling L_num in step S708 (step S708: Yes), the process returns to step S703 and otherwise (step S708: No), the procedure proceeds to step S709.

In step S709, motion video segmenting device 100 determines whether or not foreground amount D_size within the difficulty degree determination region is larger than a value obtained by multiplying foreground amount ALL_size of the whole still image by predetermined rate. Predetermined rate is a preset rate for determining whether or not the difficulty degree of the editing operation is high and is, for example, 60%. In a case where it is determined that the foreground amount D_size within the difficulty degree determination region is larger than the value obtained by multiplying foreground amount ALL_size of the whole still image by predetermined rate in step S709 (step S709: Yes), the procedure proceeds to step S710 and otherwise (step S709: No), the procedure proceeds to step S711.

In step S710, motion video segmenting device 100 determines that difficulty degree D_level of the still image of the $f^{th}$ frame which is the processing target is High.

On the other hand, in step S711, motion video segmenting device 100 determines that difficulty degree D_level of the still image of the $f^{th}$ frame is Low. That is, in the difficulty degree determination process illustrated in FIG. 7, in the still image of the $f^{th}$ frame, in a case where the foreground amount D_size within the difficulty degree determination region is larger than the value obtained by multiplying foreground amount ALL_size of the whole still image by predetermined rate, since it is assumed that there are many players in the image, it is determined that the difficulty degree is high.

Returning to the explanation of FIG. 6. In step S606, motion video segmenting device 100 determines whether or not difficulty degree D_level is High in the difficulty degree determination process of step S605. In step S606, in a case where it is determined that difficulty degree D_level is High (step S606: Yes), the procedure proceeds to step S607 and otherwise (step S606: No), the procedure proceeds to step S608.

In step S607, motion video segmenting device 100 updates difficulty degree D_level of the still image of the $f^{th}$ frame to High.

In step S608, motion video segmenting device 100 determines whether or not the number of frames f of the still image of the processing target reaches a predetermined number of frames, for example, 749 frames. In step S608, in a case where it is determined that the number of frames f reaches the predetermined number of frames (step S608: Yes), the procedure proceeds to step S610 and otherwise (step S608: No), the procedure proceeds to step S609.

In step S609, motion video segmenting device 100 increments the number of frames f by 1 and the process returns to step S602.

In step S610, motion video segmenting device 100 performs pack formation of the still image from f=0 to f=(predetermined number of frames) as one group (pack). Therefore, for example, in a case where the predetermined number of frames is 749 frames, a pack including the still images of 750 frames can be formed.

In step S611, motion video segmenting device 100 calculates a load value of the pack formed in step S610. The load value is a degree indicating a load when the corrector performs the editing operation of the pack in image processing device 200. The load value is set based on a rate occupied by the still image in which difficulty degree D_level is High in the still images included in the pack.

Figures 8, 9:
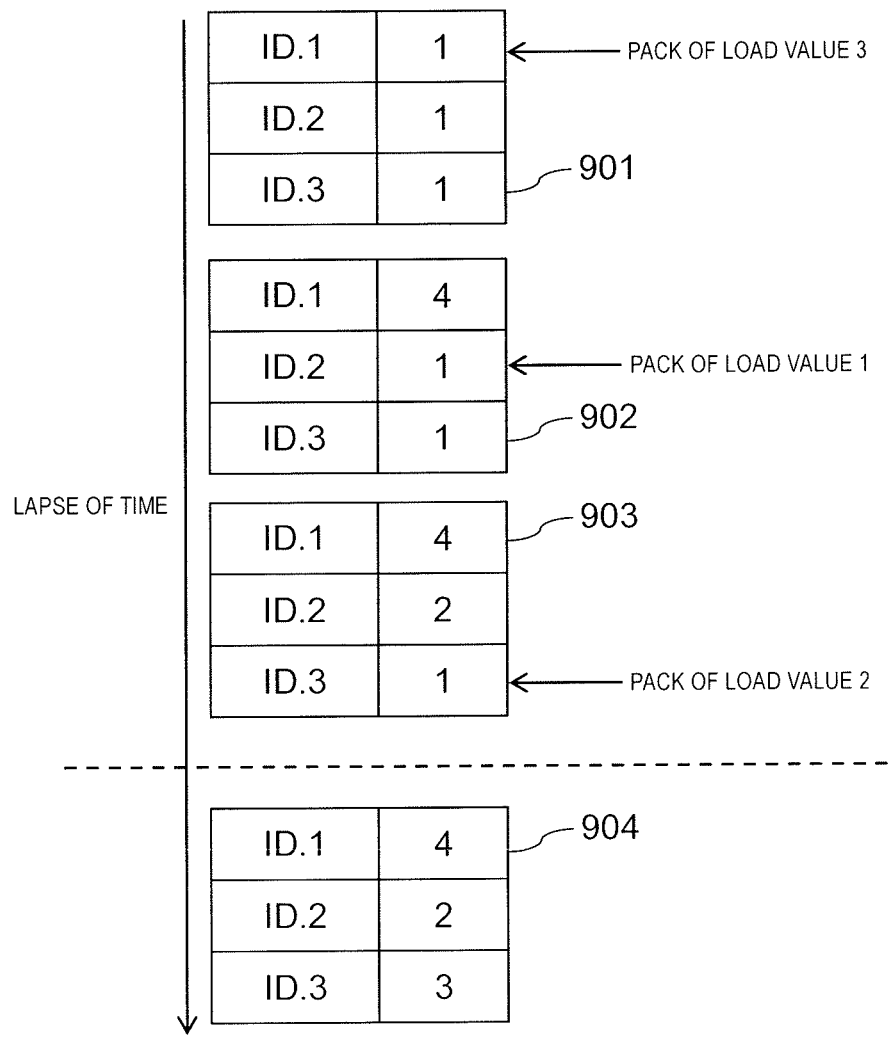
FIG. 8 is a diagram illustrating a setting method of a load value.
FIG. 9 is a diagram for explaining load value accumulation information.

FIG. 8 is a diagram illustrating a setting method of the load value. In FIG. 8, columns on a left indicate rates of the still image in which the difficulty degree D_level is High to the whole pack and columns on a right indicate examples of the load value according to the rates. In the example illustrated in FIG. 8, in a case where the rate of the number of the frames of the difficulty degree of High to the whole pack is 0, the load value is set to 1. In addition, in a case where the rate of the number of the frames of the difficulty degree of High to the whole pack is larger than 0 and less than 0.25, the load value is set to 2. In addition, in a case where the rate of the number of the frames of the difficulty degree of High to the whole pack is larger than 0.25 and less than 0.5, the load value is set to 3. In addition, in a case where the rate of the number of the frames of the difficulty degree of High to the whole pack is larger than 0.5 and less than 0.75, the load value is set to 4. In addition, in a case where the rate of the number of the frames of the difficulty degree of High to the whole pack is larger than 0.75 and less than 1.0, the load value is set to 5.

That is, the lower the rate of the number of the frames of the difficulty degree of High to the whole pack is, the lower the load value is set, and higher the rate of the number of the frames of the difficulty degree of High to the whole pack is, higher the load value is set. Moreover, in the example illustrated in FIG. 8, the load value is set to five stages, but the disclosure is not limited thereto. For example, the load value may have stages less than 5 stages, such as two stages, or may have stages larger than 5 stages illustrated in FIG. 8. In a case where the load value has 2 stages, for example, in a case where the frame of the difficulty degree of High is one, the load value may be 1, and in a case where the number of the frames of the difficulty degree of High is 0, the load value may be 0.

Returning to the explanation of FIG. 5. In step S502, motion video segmenting device 100 acquires the load value accumulation information for each of the plurality of image processing devices 200, which are candidates of the transmission destination of the plurality of the packs formed in step S501.

FIG. 9 is a diagram for explaining the load value accumulation information. In FIG. 9, tables 901 to 904 indicating identification information (ID) of image processing device 200 that is the candidate of the transmission destination of the pack and the load value accumulation information are illustrated. The load value accumulation information in the tables 901 to 904 is updated with a lapse of time.

The table 901 indicates a load value in an initial state in which no pack is transmitted to any one of image processing devices 200 of ID. 1 to ID. 3. An initial value of the load value is 1 and the load value accumulation information of each of three image processing devices 200 of ID. 1 to ID. 3 is 1. Hereinafter, for simplicity, for example, the load value accumulation information of image processing device 200 of ID. 1 is described like the load value of ID. 1.

The table 902 indicates a load value in a state where time elapses from the table 901 and a first pack having the load value of 3 is transmitted. Since the pack of the load value of 3 is transmitted to ID. 1, in the table 902, the load value of ID. 1 is updated to 4.

Furthermore, the table 903 indicates a load value in a state where time elapses from the table 902 and a second pack having the load value of 1 is transmitted. Since the pack of the load value of 1 is transmitted to ID. 2, in the table 903, the load value of ID. 2 is updated to 2.

The table 904 indicates a load value in a state where time elapses from the table 903 and a third pack having the load value of 2 is transmitted. Since the pack of the load value of 2 is transmitted to ID. 3, in the table 904, the load value of ID. 3 is updated to 3.

As described above, the load value accumulation information is a value obtained by accumulating the load value of the pack transmitted to any one of the plurality of image processing devices 200 before the current time for each image processing device 200.

Returning to the explanation of FIG. 5. In step S503, motion video segmenting device 100 determines image processing device 200 which is the transmission destination to which the pack generated in step S501 is transmitted based on the load value accumulation information acquired in step S502.

As a method of determining the transmission destination, for example, there is a method of referring the load value accumulation information acquired in step S502 and setting image processing device 200 having a smallest accumulation value of the load value to the transmission destination. In addition, in a case where the plurality of image processing devices 200 having the same load value accumulation information are present such as a state where the pack is not transmitted, for example, image processing device 200 having the smallest ID may be determined as the transmission destination.

In step S504, motion video segmenting device 100 transmits the pack generated in step S501 to the transmission destination determined in step S503.

In step S505, motion video segmenting device 100 updates the load value accumulation information corresponding to image processing device 200 of the transmission destination. Specifically, the load value calculated in step S611 is added to the load value accumulation information of image processing device 200 of the transmission destination and is updated.

In step S506, motion video segmenting device 100 determines whether or not the motion video is completed with the pack generated in step S501. Moreover, the completion of the motion video means that camera 300 stops photographing of the motion video, for example, due to the completion of the game of the sports event photographed by camera 300. In step S506, in a case where it is determined that the motion video is completed (step S506: Yes), the procedure is completed and otherwise (step S506: No), the process returns to step S501, and a process of forming a next pack is performed.

[1.2.3 Subsequent Processes]

When the pack is transmitted from motion video segmenting device 100 to image processing device 200 in step S504 illustrated in FIG. 5, as illustrated in FIG. 3, image processing device 200 receives the pack and performs the tracking process on the received pack. Image processing device 200 displays the result of the tracking process on display unit 204 in almost real time and causes the corrector to determine whether or not the tracking process is incorrect. In a case where the tracking process is incorrect, the edition acceptance process of accepting the correction by the corrector via input unit 203 is performed (step S303). The tracking process and the edition acceptance process are mainly performed by processor 201 in cooperation with the respective other configuration elements of image processing device 200.

Specifically, the tracking process includes a player detection process of extracting a region corresponding to the player in the image, a posture imparting process of imparting an initial posture of the player in a leading image of the pack, a team identification process of identifying a team to which the player belongs based on a color of the player or the like which is extracted, a position tracking process of tracking a position of the player, sports equipment such as a ball, and the like. Detailed description of the player detection process, the posture imparting process, the team identification process, the position tracking process, and the edition acceptance process is disclosed, for example, in NPL 1.

When the tracking process and the edition acceptance process are completed, image processing device 200 generates a tracking result listing the position of the player in each still image included in the pack. The tracking result generated by image processing device 200 is transmitted to motion video segmenting device 100 (step S304 of FIG. 3). Motion video segmenting device 100 joins the tracking results received from image processing device 200 in order to generate movement information for one game of each player (step S305 of FIG. 3). The movement information for one game generated as described above is useful for being superimposed on the motion video and displayed, objectively evaluating, for example, the momentum and mobility of the player, or constructing a strategy through the game.

[1.3 Effects Etc.]

As described above, in the embodiment, motion video processing system 1 includes motion video segmenting device 100, image processing device 200, and camera 300. Motion video segmenting device 100 extracts the feature amount from the image (still image) configuring the motion video photographed by camera 300, and determines the difficulty degree when the editing operation is performed on the image based on the feature amount. In the embodiment, the rate occupied by the region corresponding to the player to the whole image is adopted as the feature amount. In addition, the editing operation is an operation performed by the corrector to correct and edit the error in the tracking process of tracking the position of the player, the ball, or the like in the image, which is automatically performed by image processing device 200.

Motion video segmenting device 100 segments the motion video photographed by camera 300 into the plurality of groups (packs) each having a length of a predetermined number of frames, and determines image processing device 200 transmitting the pack based on the difficulty degree of the image included in the pack. More specifically, motion video segmenting device 100 calculates the load value for each pack based on the rate of the image having high difficulty degree included in the pack and determines image processing device 200 having the smallest accumulation value of the load value of the pack which is transmitted previously as the transmission destination when image processing device 200 which is the transmission destination of the pack is determined.

With such a configuration, motion video segmenting device 100 can determine image processing device 200 having a small load as a transmission destination of a formed pack when the pack is formed from the image photographed by camera 300. Therefore, the pack can be preferentially transmitted to image processing device 200 having a small load, so that the load of the editing operation can be dispersed for each image processing device 200 and the tracking process of the position of the player, the ball, or the like in the motion video can be efficiently performed. That is, the load of the editing operation to be performed by the corrector can be equalized for all image processing devices 200, so that it is possible to suppress variation of an editing operation time for each image processing device 200 in the whole game.

Other Embodiments

As described above, the exemplary embodiments of technique disclosed in the present application are described. However, the technique of the disclosure is not limited to the embodiments described above, but can be applied to other embodiments in which change, replacement, addition, omission, and the like are performed. Further, it is also possible to combine each of the configuration elements described in the embodiments described above to form a new embodiment.

Hereinafter, other embodiments will be illustrated. In the embodiments described above, motion video segmenting device 100 sets the difficulty degree of the editing operation on the still image of each frame to two stages of High and Low. However, motion video segmenting device 100 may set the difficulty degree in the still image of each frame, for example, to multiple stages, that is, for example, five stages. In this case, in the subsequent process, for example, in step S606 illustrated in FIG. 6, or the like, instead of determining whether the difficulty degree is High or Low, it may be determined whether or not the difficulty degree is a predetermined stage or more.

In the embodiments described above, the feature amount is extracted from the image photographed by camera 300 and the difficulty degree of the editing operation is determined based on the feature amount. In the embodiments described above, in the embodiments, for example, the rate occupied by the region corresponding to the player to the whole image is adopted as the feature amount.

However, the feature amount may be anything as long as it indicates the feature of the player in the image. That is, as a specific example of the feature amount, for example, a color, a luminance, a position of a vertex, a shape, or the like is provided.

In addition, another known feature amount may be used as long as it indicates the feature of the player in the image. In addition, in the embodiments described above, the difficulty degree is determined based on the rate of the foreground region included in the difficulty degree determination region (specific region). The difficulty degree determination region is a region that is predicted to be a lot of players set by the operator of motion video processing system 1, so that if the rate of the foreground region included in the difficulty degree determination region is high, it means that the players are densely populated in one place. However, in the disclosure, instead of determining the difficulty degree based on the rate of the foreground region included in the difficulty degree determination region (specific region), motion video segmenting device 100 may count the number of players in the difficulty degree determination region and in a case where the number of players is large, it may be determined that the difficulty degree is higher than that of a case where the number of players is small. As a method of counting the number of players in the difficulty degree determination region, a technique of the related art may be used.

In addition, in the embodiments described above, motion video segmenting device 100 determines image processing device 200 that is the transmission destination based on the accumulation value of the load values of the pack previously transmitted to image processing device 200. However, for example, in a case where the time required for the editing operation varies depending on the corrector, in a final time of the game, or the like, it is conceivable that an unprocessed pack remains in each image processing device 200. In such a case, it is desirable that the transmission destination is set in consideration of a time required for a future editing operation rather than determining image processing device 200 of the transmission destination based on an accumulation load value so far.

Therefore, motion video segmenting device 100 calculates a sum value of the load values of the packs (unprocessed packs) which have already been transmitted and not notified of the completion of the process for each image processing device 200, and the transmission destination may be set based on the sum value. In this case, image processing device 200, which completes the tracking process and the edition acceptance process for one pack, notifies motion video segmenting device 100 of the completion thereof, and motion video segmenting device 100 may calculate the sum value of the load values of the unprocessed packs by subtracting the load value of the pack notified of the completion from the load value accumulation information described above.

In addition, in the embodiments described above, image processing device 200 transmits the tracking result listing the position of the player in each still image included in the pack to motion video segmenting device 100, and image processing device 200 generates the movement information of the player for one game by joining the tracking results received from the plurality of image processing devices 200. However, the information, which is transmitted by image processing device 200 to motion video segmenting device 100 to generate the movement information of the player for one game, is not limited to the format. The information, which is transmitted by image processing device 200 to motion video segmenting device 100, may be any information useful to generate the movement information of the player for one game. For example, image processing device 200 superimposes a marker indicating the position of the player or the like on each still image included in the pack to generate a position information addition pack, and the generated position information addition pack may be transmitted to motion video segmenting device 100. Even in this case, motion video segmenting device 100 can generate the movement information of the player for one game by joining the packs received from the plurality of image processing devices 200. In addition, it is not necessary for motion video segmenting device 100 to join the tracking results or the position information addition packs generated by the plurality of image processing devices 200, and generate the movement information of the player for one game. For example, the plurality of image processing devices 200 may transmit the tracking results or the position information addition packs which are respectively generated to another motion video joining device, and the motion video joining device may join a plurality of the tracking results or the position information addition packs to generate the movement information of the player for one game.

In addition, in the embodiments described above, motion video segmenting device 100 and image processing device 200 are described as different configurations. However, for example, a function of motion video segmenting device 100 and a function of image processing device 200 may be mounted on a computer such as a small number of PCs or workstations. In such a case, the functions of motion video segmenting device 100 and the plurality of image processing devices 200 can be realized by, for example, a very small number of computers such as one computer by preparing the display unit and the input unit for performing the correction operation for the number of correctors. Therefore, an installation cost of motion video processing system 1 can be reduced.

Moreover, since the embodiments described above are intended to exemplify the technique in the disclosure, various modifications, replacements, additions, omissions, or the like may be performed within the scope of claims or the equivalent thereof. For example, in the embodiments described above, as an example of the motion video, an example, in which the motion video configuring the sports video obtained by photographing the game of the sports event is used, is described. However, the motion video used in the disclosure is not limited to the motion video configuring the sports video obtained by photographing the game of the sports event. The motion video used in the disclosure may include all the motion videos to be analyzed widely. An example of the motion video to be analyzed includes a motion video recording a behavior of a person. In a case where the disclosure is applied to the motion video recording the behavior of the person, if there are many persons who are present in a specific region in the image configuring the motion video, it is determined that the difficulty degree is higher than that of a case where there are a few persons who are present in the specific region. In addition, a motion video recording a concert image of a pop star is included in the motion video used in the disclosure. In a case where the disclosure is applied to the motion video recording the concert image of the pop star, if there are many pop stars who are present in a specific region in the image configuring the motion video, it is determined that the difficulty degree is higher than that of a case where there are a few pop stars who are present in the specific region.

INDUSTRIAL APPLICABILITY

The disclosure can be applied to the motion video segmenting method, the motion video segmenting device, and the motion video processing system that segment the motion video and determine the transmission destination, so that the load of the editing operation on the segmented motion video is substantially equal.

REFERENCE MARKS IN THE DRAWINGS

1 MOTION VIDEO PROCESSING SYSTEM
100 MOTION VIDEO SEGMENTING DEVICE
101 PROCESSOR
102 STORAGE UNIT
103 INPUT UNIT
104 DISPLAY UNIT
105 COMMUNICATION UNIT
106 BUS
200, 200A, 200B, 200C IMAGE PROCESSING DEVICE
201 PROCESSOR
202 STORAGE UNIT
203 INPUT UNIT
204 DISPLAY UNIT
205 COMMUNICATION UNIT
206 BUS
300 CAMERA
400 FIELD
401, 402 REGION
901, 902, 903, 904 TABLE

The invention claimed is:

1. A motion video segmenting method comprising:
by a processor,
extracting a feature amount from an image among a plurality of images configuring a motion video;
determining, for the image, a difficulty degree of performing an editing operation based on a feature amount included in the image;
segmenting the motion video to equal lengths to form a plurality of groups, each group of the plurality of groups including a predetermined number of frames such that each group of the plurality of groups include same number of frames; and
determining an image processing device to be a transmission destination of one group having the predetermined number of frames, among the plurality of groups, based on the difficulty degree of images configuring the one group.

2. The motion video segmenting method of claim 1, wherein the processor
determines the image processing device to be the transmission destination of the one group based on the difficulty degree of images configuring a group already transmitted.

3. The motion video segmenting method of claim 1, wherein in a case where the image processing device performs a notification of a group for which image processing is completed to the processor on a condition that a predetermined image processing is completed for all of the images included in the group, and
the processor
determines the image processing device that is the transmission destination of the one group based on a difficulty degree of images, which are already transmitted and configure a group to which a completion of the image processing is not notified for each of a plurality of the image processing devices.

4. The motion video segmenting method of claim 1, wherein the feature amount is a rate of a size of a foreground region included in a predetermined specific region of the image to a size of the foreground region of each of images of a plurality of the frames, the foreground region being a region other than a background included in each frame, and wherein the processor determines that in a case where the rate of the size of the foreground region is larger than a predetermined rate, the difficulty degree is higher than that in a case where the rate of the size of the foreground region is smaller than the predetermined rate.

5. The motion video segmenting method of claim 1, wherein the motion video is a motion video obtained by photographing a sports event, and wherein the processor determines that if there are many players who are present in a specific region in the image configuring the motion video, the difficulty degree is higher than that if there are a few players who are present in the specific region.

6. A motion video segmenting device comprising a processor, wherein the processor extracts a feature amount from an image among a plurality of images configuring a motion video;

determines, for the image, a difficulty degree of performing an editing operation based on a feature amount included in the image;

segments the motion video to equal lengths to form a plurality of groups, each group of the plurality of groups including a predetermined number of frames such that each group of the plurality of groups include same number of frames; and determines an image processing device to be a transmission destination of one group having the predetermined number of frames, among the plurality of groups based on the difficulty degree of images configuring the one group.

7. A motion video processing system comprising a motion video segmenting device having a processor and a plurality of image processing devices which perform a predetermined processing on a motion video transmitted by the motion video segmenting device, wherein the processor extracts a feature amount from an image among a plurality of images configuring the motion video;

determines, for the image, a difficulty degree of performing an editing operation based on the feature amount included in the image;

segments the motion video to equal lengths to form a plurality of groups, each group of the plurality of groups including a predetermined number of frames such that each group of the plurality of groups include same number of frames; and determines an image processing device to be a transmission destination of one group having the predetermined number of frames, among the plurality of groups, in the plurality of the image processing devices based on the difficulty degree of images configuring the one group.

* * * * *